US011475387B2

(12) United States Patent
Lioznova et al.

(10) Patent No.: US 11,475,387 B2
(45) Date of Patent: Oct. 18, 2022

(54) METHOD AND SYSTEM FOR DETERMINING PRODUCTIVITY RATE OF USER IN COMPUTER-IMPLEMENTED CROWD-SOURCED ENVIRONMENT

(71) Applicant: YANDEX EUROPE AG, Lucerne (CH)

(72) Inventors: Anna Valerevna Lioznova, Sankt-Peterburg (RU); Anastasiya Aleksandrovna Bezzubtseva, Lipetsk (RU); Alexey Valerevich Drutsa, Moscow (RU); Vladimir Vladimirovich Kukushkin, Saint Petersburg (RU)

(73) Assignee: YANDEX EUROPE AG, Lucerne (CH)

( * ) Notice: Subject to any disclaimer, the term of this patent is extended or adjusted under 35 U.S.C. 154(b) by 237 days.

(21) Appl. No.: 16/852,512

(22) Filed: Apr. 19, 2020

(65) Prior Publication Data

US 2021/0073703 A1  Mar. 11, 2021

(30) Foreign Application Priority Data

Sep. 9, 2019 (RU) ................................ 2019128272

(51) Int. Cl.
*G06Q 10/06* (2012.01)
*G06Q 50/20* (2012.01)
(Continued)

(52) U.S. Cl.
CPC ......... *G06Q 10/06393* (2013.01); *G06N 5/04* (2013.01); *G06N 20/00* (2019.01);
(Continued)

(58) Field of Classification Search
CPC ......... G06Q 10/103; G06Q 10/063114; G06Q 10/063118; G06Q 10/06316;
(Continued)

(56) References Cited

U.S. PATENT DOCUMENTS 6,560,597 B1  5/2003  Dhillon et al.
7,366,705 B2  4/2008  Zeng et al.
(Continued)

FOREIGN PATENT DOCUMENTS

CN  103914478 A  7/2014
CN  104463424 A  3/2015
(Continued)

OTHER PUBLICATIONS

Chittilappilly et al., A Survey of General Purpose Crowdsourcing Techniques, Sep. 1, 2016, IEEE Transactions on Knowledge and Data Engineering, vol. 28, Issue: 9, pp. 2246-2266 (Year: 2016).*
(Continued)

*Primary Examiner* — Robert D Rines
(74) *Attorney, Agent, or Firm* — BCF LLP

(57) ABSTRACT

There is disclosed a method and system for determining a productivity rate of a user in a computer-implemented crowd-sourced environment. The method comprises, in a training phase: acquiring a training project; determining, set of project-specific features indicative of one or more characteristics of the training project; acquiring, a plurality of training results; determining a set of user-task specific features; determining, a user activity history associated with the user; generating a set of training data including the set of project-specific features, the set of user-task specific features, and the user activity history; training a machine learning algorithm (MLA), the training including: determining, a set of features representative of a property of the set of training data; and generating an inferred function based
(Continued)

| # | Results | Timestamp |
|---|---------|-----------|
| 1 | A | 60 Seconds |
| 2 | B | 50 Seconds |
| 3 | A | 50 Seconds |
| ... | ... | ... |
| 10 | A | 25 Seconds |
| 11 | B | 25 Seconds | on the set of features, the inferred function being configured to determine the productivity rate of the user for a given project.

19 Claims, 6 Drawing Sheets

(51) Int. Cl.
  *G06N 5/04* (2006.01)
  *G06Q 10/10* (2012.01)
  *G06N 20/00* (2019.01)
(52) U.S. Cl.
  CPC ....... *G06Q 10/103* (2013.01); *G06Q 10/1091* (2013.01); *G06Q 50/2057* (2013.01)
(58) Field of Classification Search
  CPC ....... G06Q 10/06398; G06Q 10/06393; G06Q 10/1091; G06Q 10/105; H04M 3/51; G06N 5/04; G06N 20/00
  See application file for complete search history.

(56) References Cited

U.S. PATENT DOCUMENTS

| | | |
|---|---|---|
| 7,693,738 B2 | 4/2010 | Guinta et al. |
| 7,747,083 B2 | 6/2010 | Tawde et al. |
| 8,266,130 B2 | 9/2012 | Jones et al. |
| 8,498,892 B1 | 7/2013 | Cohen et al. |
| 8,554,605 B2 | 10/2013 | Oleson et al. |
| 8,626,545 B2 | 1/2014 | Van et al. |
| 9,268,766 B2 | 2/2016 | Bekkerman |
| 9,330,071 B1 | 5/2016 | Ahmed et al. |
| 9,584,540 B1 | 2/2017 | Chan et al. |
| 9,594,944 B2 | 3/2017 | Kompalli et al. |
| 9,767,419 B2 | 9/2017 | Venanzi et al. |
| 9,911,088 B2 | 3/2018 | Nath et al. |
| 10,061,848 B2 | 8/2018 | Basu et al. |
| 10,095,688 B1 | 10/2018 | Schilling et al. |
| 10,162,734 B1 | 12/2018 | Podgorny et al. |
| 10,445,671 B2 | 10/2019 | Dubey et al. |
| 10,685,329 B2 | 6/2020 | Taylor et al. |
| 10,978,056 B1 | 4/2021 | Challa et al. |
| 2002/0032591 A1 | 3/2002 | Mahaffy et al. |
| 2003/0154181 A1 | 8/2003 | Liu et al. |
| 2007/0226207 A1 | 9/2007 | Tawde |
| 2007/0260601 A1 | 11/2007 | Thompson et al. |
| 2008/0027913 A1 | 1/2008 | Chang et al. |
| 2010/0153156 A1 | 6/2010 | Guinta et al. |
| 2010/0293026 A1 | 11/2010 | Vojnovic et al. |
| 2011/0173183 A1 | 7/2011 | Dasdan et al. |
| 2011/0313801 A1 | 12/2011 | Biewald et al. |
| 2012/0005131 A1 | 1/2012 | Horvitz et al. |
| 2012/0131572 A1 | 5/2012 | Shae et al. |
| 2012/0150579 A1 | 6/2012 | De Wit et al. |
| 2012/0265573 A1 | 10/2012 | Van et al. |
| 2013/0006717 A1 | 1/2013 | Oleson et al. |
| 2013/0029769 A1 | 1/2013 | Lee et al. |
| 2013/0096968 A1 | 4/2013 | Van Pelt et al. |
| 2013/0111488 A1 | 5/2013 | Gatti et al. |
| 2013/0159292 A1 | 6/2013 | Larlus et al. |
| 2013/0231969 A1 | 9/2013 | Van et al. |
| 2014/0122188 A1 | 5/2014 | Van Pelt et al. |
| 2014/0172767 A1 | 6/2014 | Chen et al. |
| 2014/0278634 A1 | 9/2014 | Horvitz et al. |
| 2014/0343984 A1 | 11/2014 | Shahabi et al. |
| 2014/0355835 A1 | 12/2014 | Rodriguez-Serrano et al. |
| 2015/0004465 A1 | 2/2015 | Basu et al. |
| 2015/0074033 A1 | 3/2015 | Shah et al. |
| 2015/0086072 A1 | 3/2015 | Kompalli et al. |
| 2015/0178659 A1 | 6/2015 | Dai et al. |
| 2015/0213392 A1 | 7/2015 | Kittur et al. |
| 2015/0254593 A1 | 9/2015 | Ramos et al. |
| 2015/0254596 A1 | 9/2015 | Nayar et al. |
| 2015/0254785 A1 | 9/2015 | Yang et al. |
| 2015/0262111 A1 | 9/2015 | Yu et al. |
| 2015/0317582 A1 | 11/2015 | Nath et al. |
| 2015/0347519 A1 | 12/2015 | Hornkvist et al. |
| 2015/0356488 A1* | 12/2015 | Eden ..................... G06Q 50/01 705/7.41 |
| 2015/0356489 A1 | 12/2015 | Kazai et al. |
| 2015/0363741 A1 | 12/2015 | Chandra et al. |
| 2016/0041849 A1 | 2/2016 | Naveh et al. |
| 2016/0100000 A1 | 4/2016 | Dey et al. |
| 2016/0132815 A1 | 5/2016 | Itoko et al. |
| 2016/0140477 A1 | 5/2016 | Karanam et al. |
| 2016/0210570 A1 | 7/2016 | Lee et al. |
| 2016/0232221 A1 | 8/2016 | McCloskey et al. |
| 2016/0035785 A1 | 12/2016 | Fan et al. |
| 2017/0011077 A1 | 1/2017 | Kypreos et al. |
| 2017/0024931 A1 | 1/2017 | Sheffer et al. |
| 2017/0046794 A1 | 2/2017 | Shukla et al. |
| 2017/0052761 A1 | 2/2017 | Gunshor et al. |
| 2017/0061341 A1 | 3/2017 | Haas et al. |
| 2017/0061356 A1* | 3/2017 | Haas ................ G06Q 10/06316 |
| 2017/0061357 A1 | 3/2017 | Dubey et al. |
| 2017/0103451 A1 | 4/2017 | Alipov et al. |
| 2017/0154313 A1 | 6/2017 | Duerr et al. |
| 2017/0185944 A1 | 6/2017 | Volkov et al. |
| 2017/0200101 A1 | 7/2017 | Kumar et al. |
| 2017/0220973 A1 | 8/2017 | Byham et al. |
| 2017/0228749 A1 | 8/2017 | Larvol et al. |
| 2017/0293859 A1 | 10/2017 | Gusev et al. |
| 2017/0309193 A1 | 10/2017 | Joseph et al. |
| 2017/0353477 A1 | 12/2017 | Faigon et al. |
| 2017/0372225 A1 | 12/2017 | Foresti et al. |
| 2018/0005077 A1 | 1/2018 | Wang et al. |
| 2018/0144283 A1 | 5/2018 | Freitas et al. |
| 2018/0144654 A1 | 5/2018 | Olsen |
| 2018/0196579 A1 | 7/2018 | Standefer et al. |
| 2018/0331897 A1 | 11/2018 | Zhang et al. |
| 2018/0357286 A1 | 12/2018 | Wang et al. |
| 2019/0258985 A1* | 8/2019 | Guastella ............... G06N 20/00 |
| 2019/0318291 A1 | 10/2019 | Diriye et al. |
| 2020/0327582 A1 | 10/2020 | Fedorova et al. |
| 2020/0372338 A1 | 11/2020 | Woods et al. |

FOREIGN PATENT DOCUMENTS

| | | |
|---|---|---|
| CN | 105608318 A | 5/2016 |
| CN | 106203893 A | 12/2016 |
| CN | 106327090 A | 1/2017 |
| CN | 106446287 A | 2/2017 |
| CN | 106557891 A | 4/2017 |
| CN | 107767055 A | 3/2018 |
| CN | 107767058 A | 3/2018 |
| CN | 107909262 A | 4/2018 |
| CN | 104794573 B | 5/2018 |
| CN | 109272003 A | 1/2019 |
| CN | 109670727 A | 4/2019 |
| CN | 110020098 A | 7/2019 |
| CN | 110503396 A | 11/2019 |
| CN | 110909880 A | 3/2020 |
| CN | 110928764 A | 3/2020 |
| CN | 111191952 A | 5/2020 |
| CN | 111291973 A | 6/2020 |
| CN | 111723930 A | 9/2020 |
| EP | 3438897 A1 | 2/2019 |
| KR | 102155790 B1 | 9/2020 |
| KR | 102156582 B1 | 9/2020 |
| RU | 2672171 C1 | 11/2018 |
| WO | 0010296 A2 | 2/2000 |
| WO | 2017222738 A1 | 12/2017 |

OTHER PUBLICATIONS

Russian Search Report dated Jan. 15, 2021 issued in respect of the counterpart Russian Patent Application No. RU2019116267.
Russian Search Report dated Dec. 16, 2020 issued in respect of the counterpart Russian Patent Application No. RU2019111283.

(56) References Cited

OTHER PUBLICATIONS

Ustalov "Towards the Automated Collaborative Process for Language Resource Construction", Inzhenernyy vestnik Dona Journal, Issue No. 1(48), Published Mar. 20, 2018.

Vaibhav B. Sinha et al., "Fast Dawid-Skene: A Fast Vote Aggregation Scheme for Sentiment Classification", Department of Computer Science and Engineering, Indian Institute of Technology Hyderabad, Telangana, Sep. 7, 2018; https://arxiv.org/abs/1803.02781.

Hongwei Li et al., "Error Rate Bounds in Crowdsourcing Models", Department of Statistics, UC Berkeley, Deparlment of EECS, UC Berkeley and Microsoft Research, Redmond, Jul. 10, 2013. https://arxiv.org/pdf/1307.2674.pdf.

Hongwei Li et al., "Error Rate Bounds and Iterative Weighted Majority Voting for Crowdsourcing", University of California, Berkeley, Nov. 15, 2014; https://arxiv.org/pdf/1411.4086.pdf.

Hideaki et al., "Analysis of Minimax Error Rate for Crowdsourcing and Its Application to Worker Clustering Model", https://arxiv.org/pdf/1802.04551.pdf Jun. 9, 2018.

Changbo et al., "Online Crowdsourcing", https://arxiv.org/abs/1512.02393, Submitted on Dec. 8, 2015 (v1), last revised Feb. 8, 2019 (this version, v2).

Vikas et al., "Eliminating Spammers and Ranking Annotators for Crowdsourced Labeling Tasks", Journal of Machine Learning Research 13 (2012) 491-518; http://www.jmlr.org/papers/volume13/raykar12a/raykar12a.pdf.

Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.

Lease, "On Quality Control and Machine Learning in Crowdsourcing", School of Information, University of Texas at Austin; 2011, https://www.ischoolutexas.edu/~ml/papers/lease-hcomp11.pdf.

Gadiraju, "Understanding Malicious Behavior in Crowdsourcing Platforms: The Case of Online Surveys", http://eprints.whiterose.ac.uk/95877/1/Understanding%20malicious%20behaviour.pdf; 2015 https://doi.org/10.1145/2702123.2702443.

Carsten Eickhoff, "Cognitive Biases in Crowdsourcing", Dept. of Computer Science, Zurich, Switzerland, 2018, https://brown.edu/Research/AI/files/pubs/wsdm18.pdf.

Ece Kamar, "Identifying and Accounting for Task-Dependent Bias in Crowdsourcing", Microsoft Research, Redmond, WA, USA, 2015. http://erichorvitz.com/hcomp_2015_learning_bias.pdf.

D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.

Khazankin, "QOS-Based Task Scheduling in Crowdsourcing Environments", Distributed Systems Group, Vienna University of Technology, Argentinierstrasse 8/184-1, A-1040 Vienna, Austria, 2011.

Yuen, "Task recommendation in crowdsourcing systems", Crowdkdd '12 Proceedings of the First International Workshop on Crowdsourcing and Data Mining, pp. 22-26, Beijing, China, Aug. 2012.

P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.

Thorsten et al. "A Collaborative Document Management Environment for Teaching and Learning", published on Jan. 2000. CVE, San Francisco, pp. 197-198 DOI:10.1145/351006.351044.

Office Action dated May 12, 2022 in respect of the related U.S. Appl. No. 16/832,095.

Notice of Allowance dated May 16, 2022 received in respect of a related U.S. Appl. No. 16/777,790.

Notice of Allowance dated Jun. 1, 2022 in respect of the related U.S. Appl. No. 16/503,977.

Li et al.,"Crowdsourced Data Management: A Survey", Published on Apr. 19, 2017, IEEE Transactions on Knowledge and Data Engineering, pp. 1-23, DOI:10.1109/ICDE.2017.26.

Federova et al.,"Latent Distribution Assumption for Unbiased and Consistent Consensus Modelling", Published on Jun. 20, 2019, arXiv:1906.08776v1.

Bugakova et al. ."Aggregation of pairwise comparisons with reduction of biases", Published on Jun. 9, 2019, arXiv:1906.03711v1.

Simpson et al., "Scalable Bayesian Preference Learning for Crowds", Published on Dec. 11, 2019 arXiv:1912.01987v2.

Notice of Allowance dated Jun. 2, 2022 received in respect of a related U.S. Appl. No. 16/906,074.

Yu, "Software Crowdsourcing Task Allocation Algorithm Based on Dynamic Utility", IEEE Access (vol. 7) pp. 33094-33106, Published Mar. 13, 2019.

Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). Proceedings of the ACM Conference on Computer Supported Cooperative Work, CSCW). https://doi.org/10.1145/2441776.2441847.

Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.

Hung, "An Evaluation of Aggregation Techniques in Crowdsourcing", Web Information Systems Engineering—WISE 2013, 2013, vol. 8181, ISBN : 978-3-642-41153-3.

\* cited by examiner

| # | Results | Timestamp |
|---|---------|-----------|
| 1 | A | 60 Seconds |
| 2 | B | 50 Seconds |
| 3 | A | 50 Seconds |
| ... | ... | ... |
| 10 | A | 25 Seconds |
| 11 | B | 25 Seconds |

FIG. 4

METHOD AND SYSTEM FOR DETERMINING PRODUCTIVITY RATE OF USER IN COMPUTER-IMPLEMENTED CROWD-SOURCED ENVIRONMENT

CROSS-REFERENCE

The present application claims priority to Russian Patent Application No. 2019128272, entitled "Method and System for Determining Productivity Rate of User in Computer-Implemented Crowd-Sourced Environment", filed Sep. 9, 2019, the entirety of which is incorporated herein by reference.

FIELD

The present technology relates to methods and systems for determining productivity rate of a user, and more particularly methods and systems for determining productivity rate of a user in a computer-implemented crowd-sourced environment.

BACKGROUND

Crowdsourcing platforms, such as the Amazon Mechanical Turk™, make it possible to coordinate the use of human intelligence to perform tasks that computers are currently unable, in a shorter time and at a lower cost, compared to that needed by professional assessors.

Generally speaking, a crowdsourcing platform operates in a two-sided market ecosystem of requesters who post jobs known as Human Intelligence Tasks (HITs), and users who complete them in exchange for a monetary payment set by the requesters. The key goal of this two-sided market platform is to improve the experience of each side of the market and to make effective matching of their needs.

United States Patent Application Publication No. 2017/0103451 A1 published Apr. 13, 2017, to Yandex Europe AG, and titled "Method and System of Determining an Optimal Value of an Auction Parameter for a Digital Object", discloses method of determining an optimal value of an auction parameter for a digital object. The method comprises using: an indication of a digital object, an auction parameter associated with the digital object and an environment feature at the respective moment of time to execute an offline training of a machine learning algorithm to predict an optimal value of auction parameters for a plurality of digital objects, the plurality of digital objects being associated with the interaction history of the first portion of users. The method further comprises applying the machine learning algorithm to determine a first optimal value of an auction parameter for a plurality of digital objects associated with the second portion of users and using such determined value for determining a digital object being relevant to the request from a user from the second portion of users.

SUMMARY

Non-limiting embodiments of the present technology have been developed based on developer's appreciation of at least one technical shortcomings over at least some of the prior art solutions.

In most of the crowdsourcing platforms, the user is free to select a project to work on amongst a large set of available projects. In order to help such a user to make an informed decision on which project to work on, it is desirable to provide reliable information regarding the monetary earnings that the user may make.

Developers of the present technology acknowledge that determining the productivity rate of a given user for a given project may be easily made with moderate accuracy by inferring parameters of similar projects previously completed by the given user.

However, in the case where the performer is provided with a new type of project that includes tasks the performer has not yet seen, determining the productivity rate is much more challenging.

In developing the present technology, the developers have realized that for any given performer, there exists a so-called "learning effect", where, while executing the new project, the efficiency of a performer changes after the performer masters the type of task included in the new project. In other words, any given performer is associated with a unique learning ability, which may be used to predict the productivity rate of a new type of project previously unseen by the performer.

In accordance with a first broad aspect of the present technology, there is provided a computer-implemented method of determining a productivity rate of a user in a computer-implemented crowd-sourced environment. The method is executed by a server. The method comprises, at a training phase: acquiring, by the server, a training project to be executed in the computer-implemented crowd-sourced environment, the training project comprising a plurality of training tasks; determining, by the server, a set of project-specific features indicative of one or more characteristics of the training project; acquiring, by the server, a plurality of training results responsive to the plurality of training tasks having been submitted by the user; determining, by the server, a set of user-task specific features representative of characteristics of user interactions between the user and the plurality of training results; determining, by the server, a user activity history associated with the user, the user activity history including previously collected characteristics of the user interactions within the computer-implemented crowd-sourced environment; generating, by the server, a set of training data, the set of training data including the set of project-specific features, the set of user-task specific features, and the user activity history; training a machine learning algorithm (MLA), the training including; determining, a set of features representative of a property of the set of training data; and generating an inferred function based on the set of features, the inferred function being configured to determine the productivity rate of the user for a given project based on the set of project-specific features associated with the given project and the user activity history.

In some non-limiting embodiments, the method further comprises, at an in-use phase: acquiring, by the server, an in-use project for execution in the computer-implemented crowd-sourced environment, the in-use project comprising a plurality of in-use tasks; determining, by the server, the set of project-specific features associated with the in-use project; determining, using the MLA, the productivity rate of the user for completing the project based on the set of project-specific features associated with the in-use project and the user activity history.

In some non-limiting embodiments, the server is coupled, via a communication network, to a client device associated with the user; the acquiring the in-use project is executed prior to the client device accessing the computer-implemented crowd-sourced environment; and the method further comprising: transmitting, the productivity rate to the client device for display in response to the client device accessing the in-use project in the computer-implemented crowd-sourced environment.

In some non-limiting embodiments, each of the training tasks included within the plurality of training tasks is a first type of task; and each of the tasks included within the plurality of in-use tasks is a second type of task, the second type of task being different from the first type of task.

In some non-limiting embodiments, each of the training tasks included within the plurality of training tasks is different from a plurality of old tasks previously executed by the user in the computer-implemented crowd-sourced environment.

In some non-limiting embodiments, the plurality of old tasks is an entirety of previously executed tasks by the user within the computer-implemented crowd-sourced environment.

In some non-limiting embodiments, the plurality of training tasks being different from the plurality of old tasks allows to account for a learning effect.

In some non-limiting embodiments, the productivity rate of the user associated with the given project is at least one of: a predicted time for the user to complete the given project; and a predicted hourly earning for completing the given project.

In some non-limiting embodiments, the acquiring the plurality of training results comprises acquiring the plurality of training results in a chronological order; and wherein the set of user-task specific features comprises at least a respective time stamp for each training task within the plurality of training tasks, the time stamp being indicative of a time taken for the user to submit the associated training result; and wherein the generating the inferred function comprises determining a learning parameter associated with the user, the learning parameter being indicative of a change in efficiency of the user to submit a given training result following a number of given training results, the learning parameter being determined based at least on an analysis of the respective time stamp of each training task within the plurality of training tasks submitted in the chronological order.

In some non-limiting embodiments, the determining the productivity rate of the user for the given project comprises determining the productivity rate based at least on the learning parameter of the user.

In some non-limiting embodiments, the set of project-specific features comprises at least one of: a number of training tasks included within the plurality of training tasks; a time of creation of the training project; a number of selectable results within each training task; user earnings per each training task; and an instruction length of the training project.

In some non-limiting embodiments, the user activity history comprises at least one of: a time of a registration of the user within the computer-implemented crowd-sourced environment; a number of projects completed since the time of registration; a type of an operating system of a device used by the user for submitting the plurality of training results; and a type of the device.

In some non-limiting embodiments, the MLA is a gradient boosting decision trees model based MLA.

In accordance with another broad aspect of the present technology, there is provided a system for determining a productivity rate of a user in a computer-implemented crowd-sourced environment. The system comprises a server comprising a processor configured to, at a training phase: acquire a training project to be executed in the computer-implemented crowd-sourced environment, the training project comprising a plurality of training tasks; determine a set of project-specific features indicative of one or more characteristics of the training project; acquire a plurality of training results responsive to the plurality of training tasks having been submitted by the user; determine a set of user-task specific features representative of characteristics of user interactions between the user and the plurality of training results; determine a user activity history associated with the user, the user activity history including previously collected characteristics of the user interactions within the computer-implemented crowd-sourced environment; generate a set of training data, the set of training data including the set of project-specific features, the set of user-task specific features, and the user activity history; train a machine learning algorithm (MLA), to train the MLA the processor being configured to: determine a set of features representative of a property of the set of training data; and generate an inferred function based on the set of features, the inferred function being configured to determine the productivity rate of the user for a given project based on the set of project-specific features associated with the given project and the user activity history.

In some non-limiting embodiments, the processor is further configured to: at an in-use phase: acquire an in-use project for execution in the computer-implemented crowd-sourced environment, the in-use project comprising a plurality of in-use tasks; determine the set of project-specific features associated with the in-use project; determine using the MLA, the productivity rate of the user for completing the project based on the set of project-specific features associated with the in-use project and the user activity history.

In some non-limiting embodiments, the server is coupled, via a communication network, to a client device associated with the user; the processor is configured to acquire the in-use project prior to the client device accessing the computer-implemented crowd-sourced environment; and the processor is further configured to: transmit, the productivity rate to the client device for display in response to the client device accessing the in-use project in the computer-implemented crowd-sourced environment.

In some non-limiting embodiments, each of the training tasks included within the plurality of training tasks is a first type of task; each of the tasks included within the plurality of in-use tasks is a second type of task, the second type of task being different from the first type of task.

In some non-limiting embodiments, each of the training tasks included within the plurality of training tasks is different from a plurality of old tasks previously executed by the user in the computer-implemented crowd-sourced environment.

In some non-limiting embodiments, the plurality of old tasks is an entirety of previously executed tasks by the user within the computer-implemented crowd-sourced environment.

In some non-limiting embodiments, the plurality of training tasks being different from the plurality of old tasks allows to account for a learning effect.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 depicts a schematic illustration of a list comprising training results for training the MLA during a training phase of FIG. 3.

An Appendix A is provided at the end of the present specification. The Appendix A includes a copy of a yet to be published article entitled "Prediction of Hourly Earnings and Completion Time on a Crowdsourcing Platform". This article provides additional background information, description of implementations of the non-limiting embodiments of the present technology, as well as some additional examples. The entirety of this article is incorporated herein by reference in its entirety, in all those jurisdictions where such incorporation by reference is allowed.

DETAILED DESCRIPTION

Figure 1:
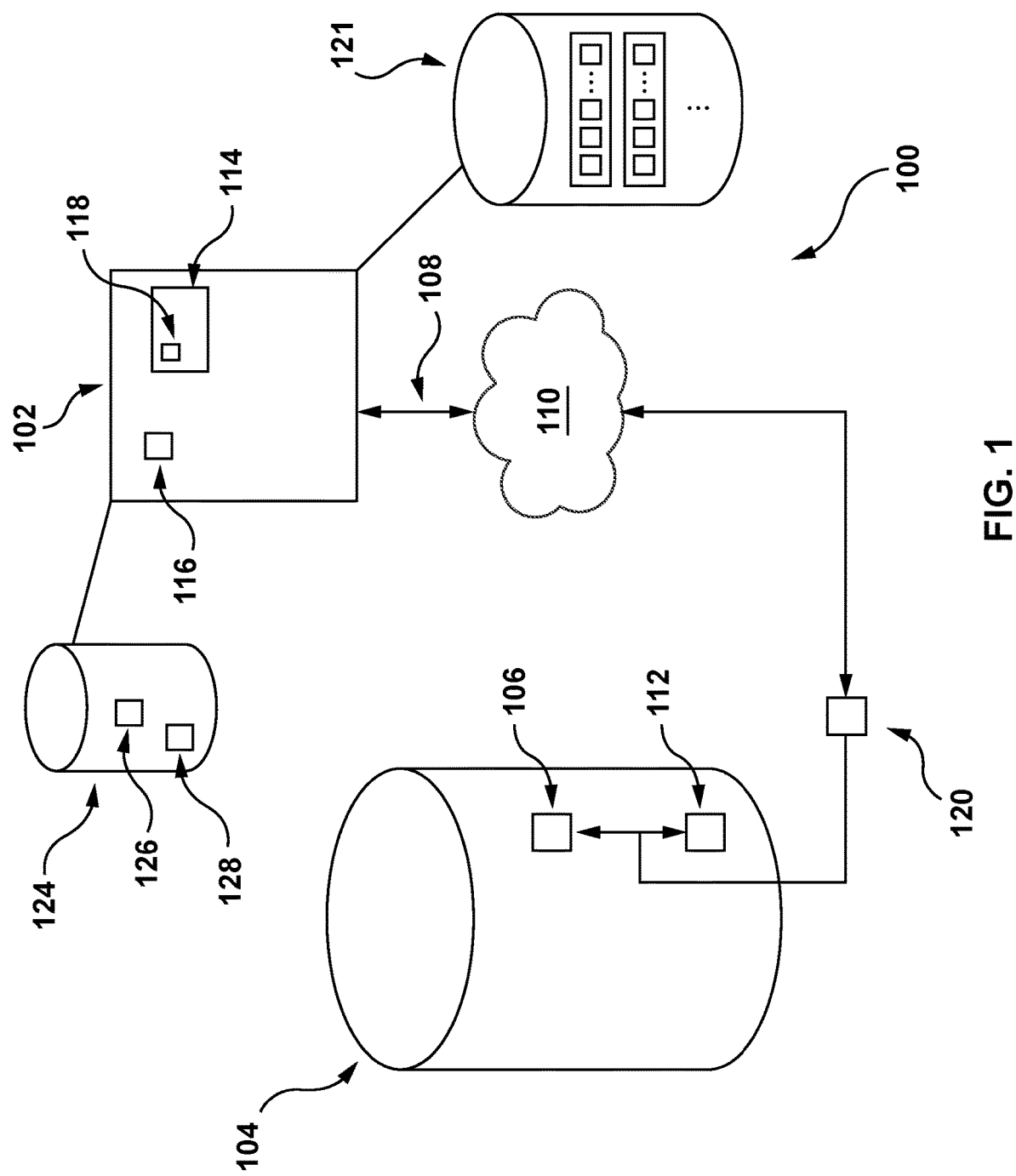
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. Thus, the system 100 is an example of a computer-implemented crowd-sourced environment 100.

It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of an identity of a human assessor 106, who has indicated his/her availability for completing at least one type of a crowd-sourced project. Needless to say, although only one human assessor is shown within the database 104, this is done for ease of understanding, and it should be understood that the database 104 may store an indication of a plurality of human assessors.

In some non-limiting embodiments of the present technology, the database 104 is under control and/or management of a provider of crowd-sourced services, such as Yandex LLC of Lev Tolstoy Street, No. 16, Moscow, 119021, Russia. In alternative non-limiting embodiments of the present technology, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or be managed at least in part by the server 102. In accordance with the non-limiting embodiments of the present technology, the database 104 comprises sufficient information associated with the identity of the human assessor 106 to allow an entity that has access to the database 104, such as the server 102, to assign and transmit one or more projects to be completed by the human assessor 106.

In accordance with the non-limiting embodiments of the present technology, the database 104 stores a quality score 112 associated with the human assessor 106. The quality score 112 of the human assessor 106 indicates a reliability of a given result of a task completed by the human assessor 106, or in other words, an error rate of the given human assessor 106.

How the quality score 112 of the human assessor 106 is determined is not limited. For example, the quality score 112 may be determined based on a first plurality of "honeypot tasks" completed by the human assessor 106. In the present specification, the term "honeypot tasks" means a task the correct result of which is known prior to the task being submitted to the human assessor 106 being tested/assessed for the quality score associated therewith, for completion thereof, which correct result is not provided to the human assessor 106 being assessed.

The results of the first plurality of honeypot tasks provided by the human assessor 106 are recorded in the database 104 in a suitable data structure (not depicted). A percentage of the first plurality of honeypot tasks that the human assessor 106 completes correctly is calculated and recorded in the database 104 as the quality score 112 of the human assessor 106. For example, if the human assessor 106 completes twenty honeypot tasks and provides a result matching the corresponding known correct result to eighteen of the twenty honeypot tasks, then the quality score 112 of the human assessor 106 is determined to be 18/20=0.9 (90%). Needless to say, the quality score may be expressed in a number of different formats.

In some non-limiting embodiments of the present technology, the quality score 112 may be determined based on a statistical analysis of previously completed tasks and checks executed by a trusted human assessor.

The server 102 can be implemented as a conventional computer server. In an example of a non-limiting embodiment of the present technology, the server 102 can be implemented as a Dell™ PowerEdge™ Server running the Microsoft Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments of the present technology, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a project database 121. In alternative non-limiting embodiments of the present technology, the project database 121 may be communicatively coupled to the server 102 via the communication network 110. Although the project database 121 is illustrated schematically herein as a single entity, it is contemplated that the project database 121 may be configured in a distributed manner.

The project database 121 is populated with a plurality of projects (not separately numbered), each project comprising a plurality of human intelligence tasks (HITs, hereinafter "digital task" or, simply "tasks") (not separately numbered).

How the project database 121 is populated with the plurality of projects is not limited. Generally speaking, one or more requesters (not shown) may submit one or more projects to be completed to the crowd-sourcing application 118 (which are then stored in the project database 121). In some non-limiting embodiments of the present technology, the one or more requesters may specify the type of assessors the project/task is destined to, and/or a budget to be allocated to a human assessor completing tasks included in the project.

How the projects are implemented is not limited. In some non-limiting embodiments of the present technology, the project database 121 includes projects that are pairwise comparison projects.

Figure 6:
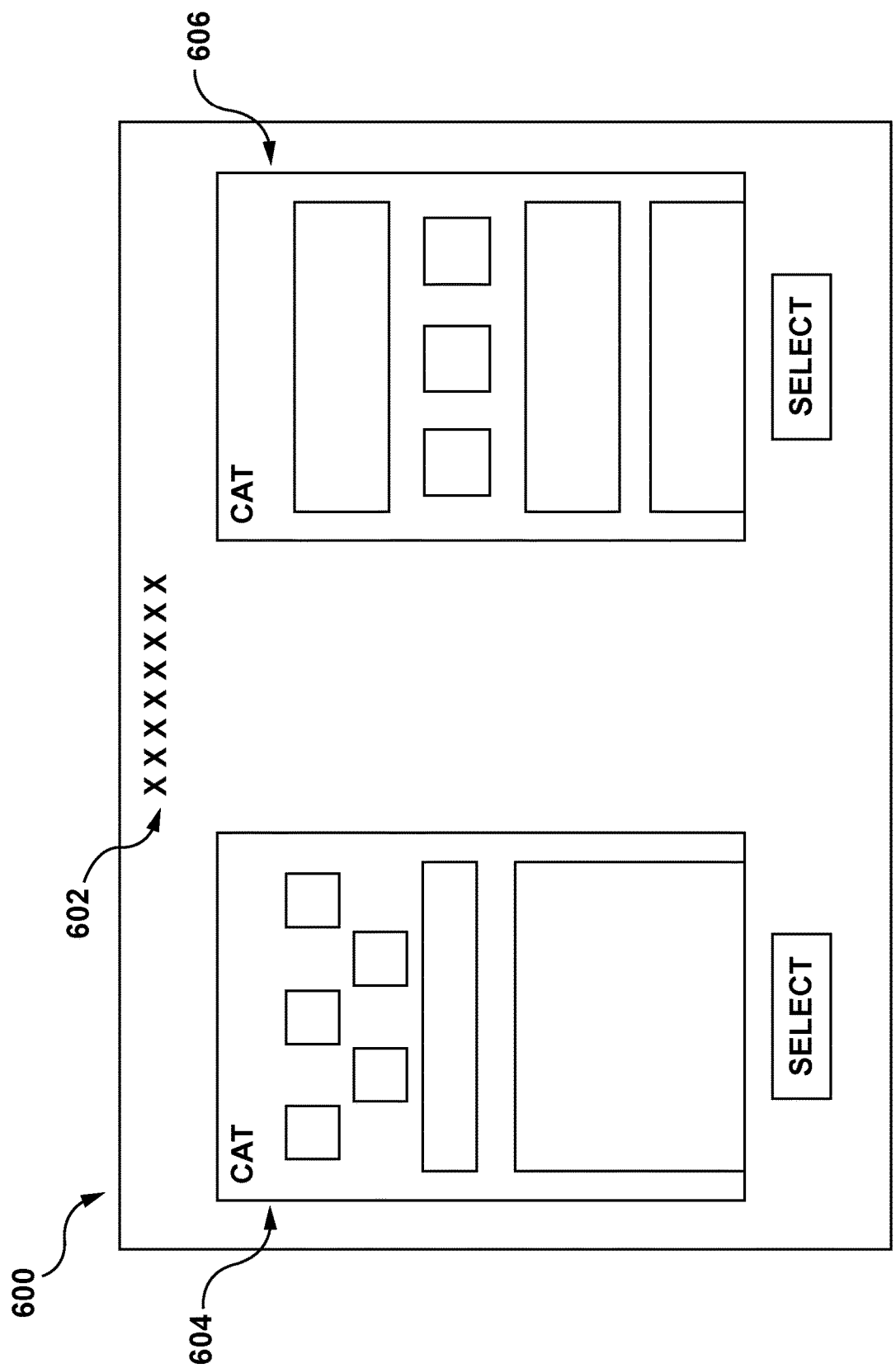
FIG. 6 depicts a screen shot of a crowd-source interface implemented in accordance with a non-limiting embodiment of the present technology, the interface being depicted as displayed on the screen of an electronic device of the system of FIG. 1.

A pairwise comparison project includes one or more tasks in which the human assessors are asked to select between a first choice and a second choice. With reference to FIG. 6, there is depicted a screen shot of a crowd-source interface 600 implemented in accordance with a non-limiting embodiment of the present technology (the example of the interface 600 being depicted as displayed on the screen of the electronic device 120). The screen shot 600 illustrates a search engine result page (SERP) pairwise comparison task.

In some embodiments of the present technology, the interface 600 is presented when the human assessor 106 selects a SERP pairwise comparison project. The interface 600 includes an instruction 602 to the human assessor, a first SERP 604 and a second SERP 606. For the avoidance of any doubt, it should be mentioned that text (and more specifically each letter) included within the interface 600 is represented by "X", however, in reality the text is made up of words in a given language (such as, English). For example, the instruction 602 may comprise instruction to the human assessor 106 to select between the first SERP 604 and the second SERP 606 that better represent the search phrase "CAT". Needless to say, other types of pairwise comparison tests are contemplated.

In some non-limiting embodiments of the present technology, the project database 121 also includes projects that are non-pairwise projects. For example, a non-pairwise project may comprise tasks where the human assessors are provided with one or more sentences in a source language (such as English) and asked to input a translation of the one or more sentences into a target language (such as Russian). In another example, another non-pairwise project may comprise tasks where the human assessors are provided with one or more audio files and asked to transcribe the audio files. Needless to say, other types of non-pairwise projects are contemplated.

The server 102 is configured to communicate with various entities via the communication network 110. Examples of the various entities include the database 104, an electronic device 120 of the human assessor 106, and other devices that may be coupled to the communication network 110. Accordingly, the crowd-sourcing application 118 is configured to retrieve a given project from the project database 121 and send the given project to the electronic device 120 used by the human assessor 106 to complete the given project, via the communication network 110 for example. Similarly, in some non-limiting embodiments of the present technology, the server 102 is configured to receive a set of responses to the tasks of the given project that has been completed by the human assessor 106.

It is contemplated that any suitable file transfer technology and/or medium could be used for this purpose. It is also contemplated that the project could be submitted to the human assessor 106 via any other suitable method, such as by making the project remotely available to the human assessor 106.

In some non-limiting embodiments of the present technology, the server 102 is further communicatively coupled to a log database 124 via a dedicated link (not numbered). In alternative non-limiting embodiments of the present technology, the log database 124 may be communicatively coupled to the server 102 via the communication network 110, without departing from the teachings of the present technology. Although the log database 124 is illustrated schematically herein as a single entity, it is contemplated that the log database 124 may be configured in a distributed manner.

The log database 124 is configured to collect and store information associated with the human assessor 106 and the projects stored within the project database 121.

For example, the log database 124 may store a user activity history 126, which comprises parameters and characteristics of the human assessor's 106 interactions with the crowd-sourcing application 118, which include, but not limited to:
  The time of registration of the human assessor 106 with the crowd-sourcing application 118;
  A number of projects completed by the human assessor 106 since the time of registration;
  The type of projects executed by the human assessor 106 since the time of registration;
  The quality score of the human assessor 106;
  A type of an operating system of the electronic device 120; and
  A type of the electronic device 120 (for example, a desktop, a tablet computer, a smart phone and the like).

In some non-limiting embodiments of the present technology, the log database 124 is further configured to store a set of project-specific features 128 associated with each project stored within the project database 121. For example, the set of project-specific features 128 of a given project may include one or more of, but not limited to:
  An ID of the given project;
  The IDs of the tasks included within the given project;
  A number of tasks included within the given project;
  A number of tasks for which an answer is known (i.e. a "honeypot" task) within the given project;
  The user earnings on the one or more tasks included within the given project;
  A creation time of the given project;
  A number of required fields within each task included within the given project;
  A length of the instruction provided on an interface of the given project (hereinafter "task interface");
  A number of string inputs within the task interface;
  A number of radio buttons within the task interface;
  A number of checkboxes within the task interface;
  A number of dropdown lists within the task interface;
  A number of buttons for image upload within the task interface;
  A number of buttons for audio upload within the task interface;
  A number of buttons for video upload within the task interface;
  A number of buttons for recording within the task interface;
  A number of buttons with click validation within the task interface;
  A number of fields with editors for image area selection within the task interface;
  A number of images within the task interface;
  A number of audios within the task interface;
  A number of videos within the task interface;
  A number of buttons within the task interface;
  A number of inline frames within the task interface;
  A number of formatted html blocks within the task interface;
  A number of side by side comparisons within the task interface;
  A language of instruction for the given project;
  A word count of the instruction for the given project; and
  A Flesch-Kincaid grade level score and/or a Flesch reading ease score for the instruction of the given project.

How the set of project-specific features 128 is generated is not limited. For example, the set of project-specific features 128 may be generated automatically in response to the given project being submitted by a requester to the crowd-sourcing application 118.

Although the description of the system 100 has been made with reference to various hardware entities (such as the database 104, the server 102, the log database 124, the project database 121 and the like) depicted separately, it should be understood that this is done for ease of understanding. It is contemplated that the various functions executed by these various entities be executed by a single entity or be distributed among different entities.

Crowd-Sourcing Application 118

Figure 2:
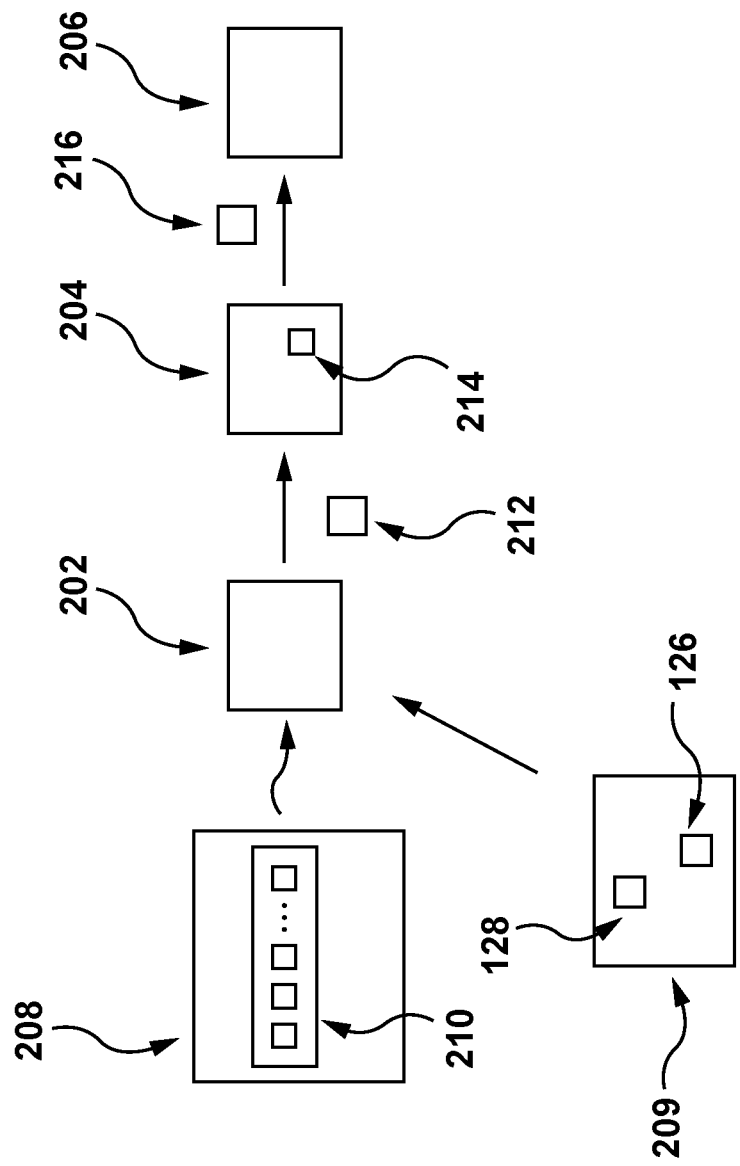
FIG. 2 depicts a schematic diagram of a process for determining a productivity rate for a human assessor for a given task in a crowd-sourced environment.

With reference to FIG. 2, there is depicted a schematic diagram of a process for determining a productivity rate of the human assessor 106 to execute a given project. For example, the productivity rate may refer to a predicted time required for the human assessor 106 to complete the given project, or predicted hourly earnings for the human assessor 106 when completing the given project.

The process for determining the productivity rate is executed by the crowd-sourcing application 118 (see FIG. 1) implemented in accordance with a non-limiting embodiment of the present technology. The crowd-sourcing application 118 executes (or otherwise has access to): a receiving routine 202, an evaluation routine 204, and an output routine 206.

In the context of the present specification, the term "routine" refers to a subset of the computer executable program instructions of the crowd-sourcing application 118 that is executable by the server processor 116 (the receiving routine 202, the evaluation routine 204, and the output routine 206). For the avoidance of any doubt, it should be expressly understood that the receiving routine 202, the evaluation routine 204, and the output routine 206 are illustrated herein as separate entities for ease of explanation of the processes executed by the crowd-sourcing application 118. It is contemplated that some or all of the receiving routine 202, the evaluation routine 204, and the output routine 206 may be implemented as one or more combined routines.

For ease of understanding the present technology, functionality of each of the receiving routine 202, the evaluation routine 204, and the output routine 206, as well as data and/or information processed or stored therein are described below.

The following description of the functionality of each one of the receiving routine 202, the evaluation routine 204 and the output routine 206 is primarily made from the perspective of an in-use phase of the crowd-sourcing application 118. However, for ease of understanding the present technology, reference to one or more training phase(s) to better understand one or more functionalities used in the in-use phase has also been included.

Receiving Routine 202- In Use

The receiving routine 202 is configured to receive a data packet 208 from the project database 121. The data packet 208 comprises an indication of a project 210, which includes a plurality of tasks (not separately numbered). For example, the project 210 is a project that includes pairwise comparison tasks of SERPs.

How the receiving routine 202 is configured to receive the data packet 208 is not limited. For example, the data packet 208 may be transmitted to the receiving routine 202 in response to a requester submitting the project 210 to the crowd-sourcing application 118. In other words, crowd-sourcing application 118 has not yet solicited the human assessor 106 to complete the project 210.

In some non-limiting embodiments of the present technology, the receiving routine 202 is further configured to receive a data packet 209 from the log database 124. The data packet 209 comprises the user activity history 126 associated with the human assessor 106, and the set of project-specific features 128 associated with the project 210.

In some non-limiting embodiments of the present technology, it is contemplated that in response to receiving the project 210, the receiving routine 202 is configured to generate the set of project-specific features 128 associated with the project 210. Accordingly, only the user activity history 126 is retrieved by the log database 124 via the data packet 209.

In response to receiving the data packet 209, the receiving routine 202 is configured to analyze the set of project-specific features 128 and the user activity history 126 to determine if the human assessor 106 has ever a worked on a project that is similar to the project 210. In other words, the receiving routine 202 is configured to determine if the human assessor 106 has previously completed one or more projects with tasks that are the same type of the tasks included within the project 210. For example, if the project 210 is a SERP pairwise comparison project, the receiving routine 202 is configured to determine if the human assessor 106 has previously completed a SERP pairwise comparison project. If, the human assessor 106 has not previously completed a SERP pairwise comparison project, the receiving routine 202 is configured to determine that the human assessor 106 has never worked on a project that is similar to the project 210.

Let us assume, for the purpose of the present technology that the receiving routine 202 has determined that the human assessor 106 has never completed, or even started a SERP pairwise comparison project.

The receiving routine 202 is then configured to transmit a data packet 212 to the evaluation routine 204. The data packet 212 comprises (i) the set of project-specific features 128, (ii) the user activity history 126, and (iii) the project 210.

Evaluation Routine 204- In Use

In response to receiving the data packet 212, the evaluation routine 204 is configured to execute the following functions.

The evaluation routine 204 is configured to execute a machine learning algorithm (MLA) 214 trained to generate the productivity rate of the human assessor 106 with regards to the project 210.

How the MLA 214 is trained to generate the productivity rate will be described in detail below. For now, suffice it to say that based on the set of project-specific features 128 and the user activity history 126, the MLA 214 is trained to determine the predicted time for the human assessor 106 to complete the project 210 and/or the hourly earnings for the human assessor 106.

MLA 214- Training Phase

Figure 3:
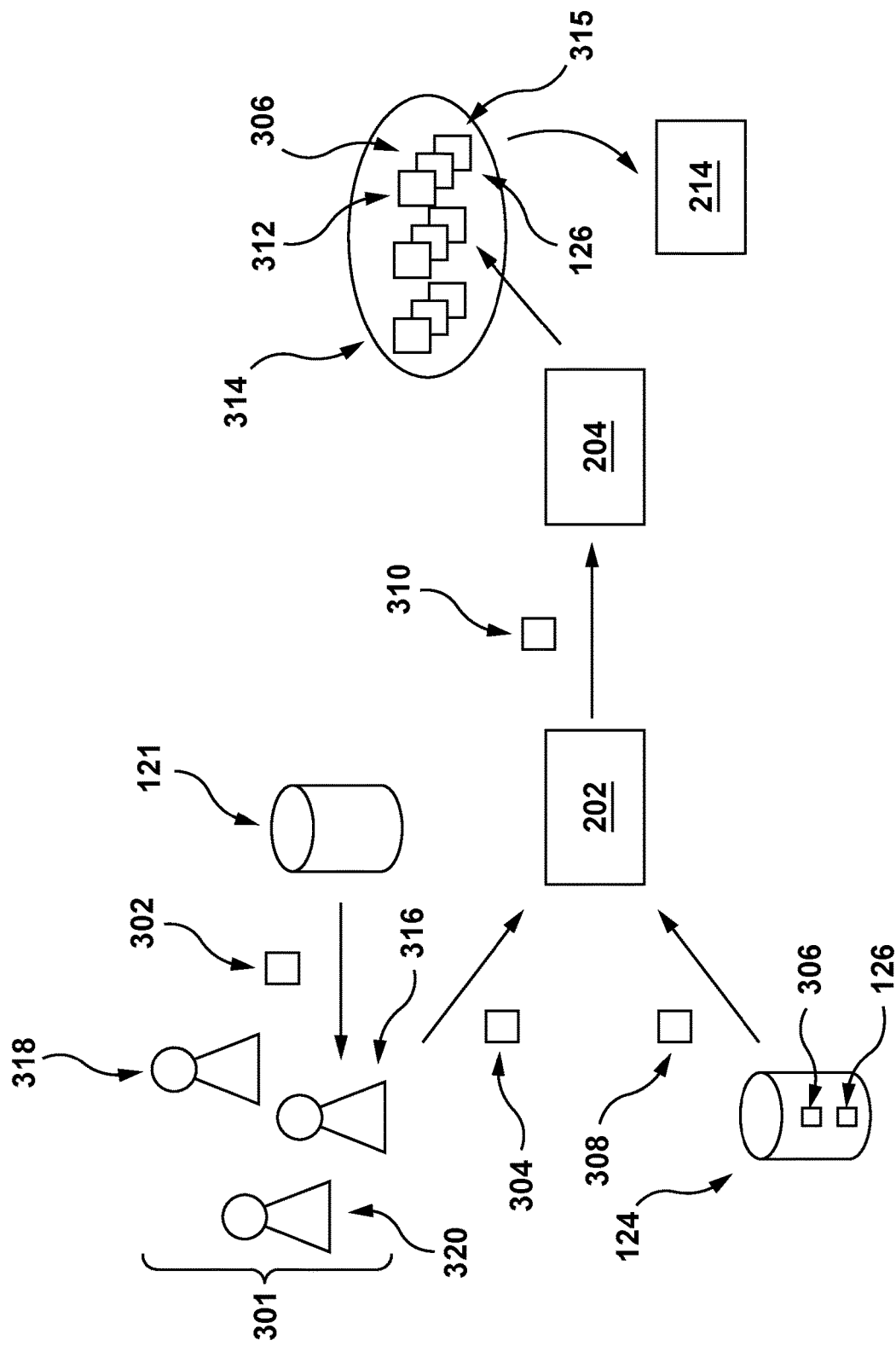
FIG. 3 depicts a diagram of a process for generating a set of training data and training the MLA executable within the system of FIG. 1.

With reference to FIG. 3, a schematic illustration of a process of training the MLA 214 is depicted.

For a better understanding of the underlying concepts of the present technology, it should be understood that the training of the MLA 214 can be broadly separated into a first phase and a second phase. In the first phase, the training input data (discussed below) is generated. In the second phase, the MLA 214 is trained using the training input data. Moreover, although the steps of training the MLA 214 is explained as being executed by the evaluation routine 204, it is not limited as such.

In the first phase, a plurality of training assessors 301 receives a training project 302 from the project database 121. Although reference is made to a "training project" stored within the project database 121, it should be expressly understood that the training project 302 need not be different from the projects explained previously with reference to FIG. 1. In other words, the training project 302 may be stored within the project database 121 using the same manner as described above. Accordingly, the log database 124 comprises a set of project-specific features 306 associated with the training project 302.

The plurality of training assessors 301 comprises a first training assessor 316, a second training assessor 318 and a third training assessor 320. In some non-limiting embodiments of the present technology, the plurality of training assessor 301 may include the human assessor 106. Although only three training assessors are displayed, it should be understood that this is done for ease of reference, and it is contemplated that the training project 302 is transmitted to more or less than three training assessors.

The training project 302 includes a plurality of training tasks (not separately numbered). Moreover, let us assume that the training project 302 is a different project than the project 210. For example, recalling that the project 210 includes tasks that are pairwise comparison of SERPs, the training project 302 may include tasks that are pairwise comparison of translations, images, and the like, as well as correspond to a non-pairwise project.

Upon completion of the training project 302 by the plurality of training assessors 301, a data packet 304 is transmitted to the receiving routine 202.

In some non-limiting embodiments of the present technology, the data packet 304 comprises a respective list of training results (not illustrated) associated with each training assessor within the plurality of training assessors 301. The list of training result is responsive to the plurality of training tasks included within the training project 302.

Figure 4:
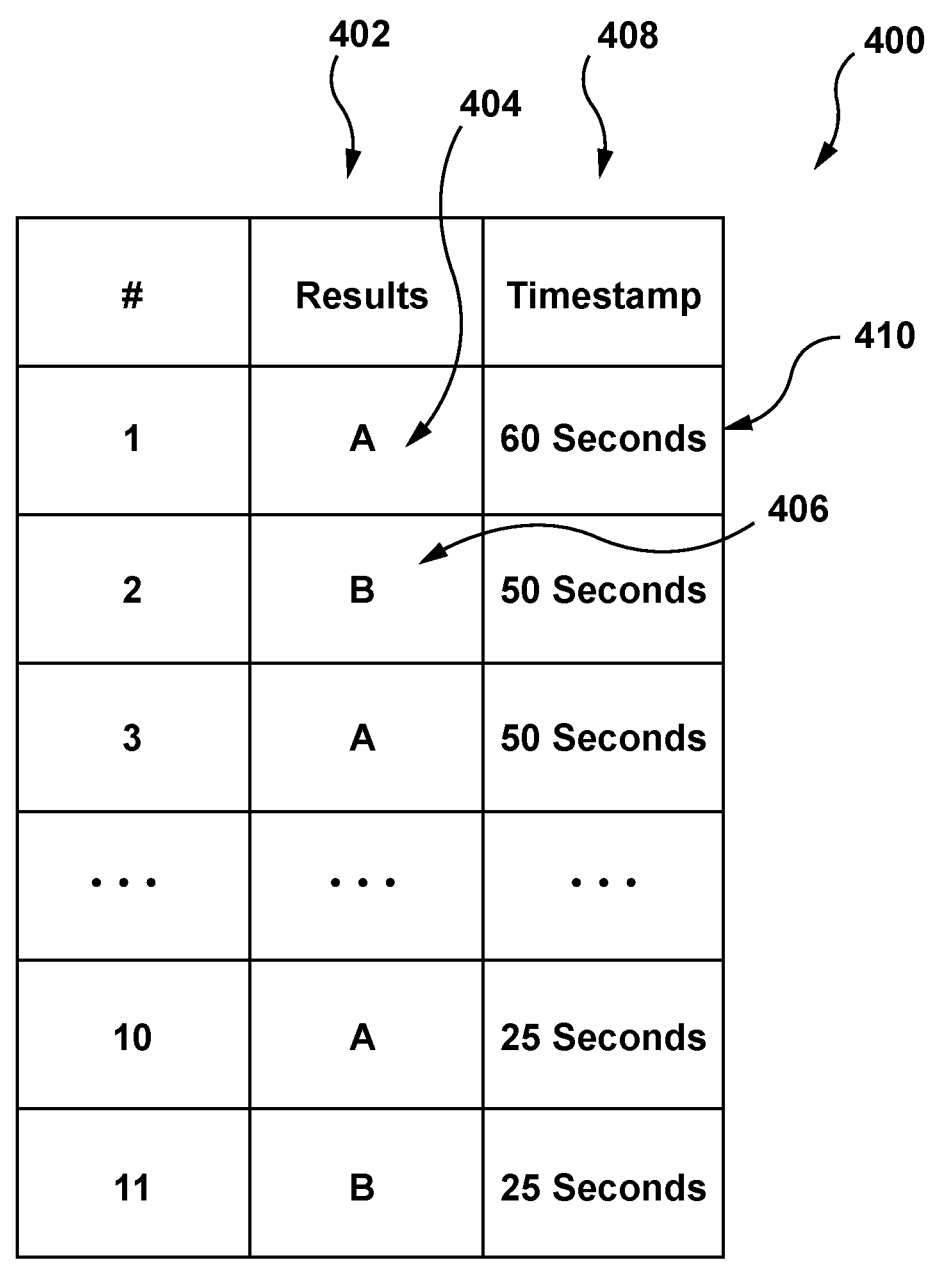

Briefly referring to FIG. 4, there is depicted a schematic illustration of a list 400 included within the data packet 304. For example, the list 400 is associated with the first training assessor 316, or in other words, comprises the training results submitted by the first training assessor 316.

The list 400 includes a set of training results 402, where each of the training result is arranged in the order submitted by the first training assessor 316. In other words, a first training result 404 has been submitted first, followed by a second training result 406, and the like, by the first training assessor 316.

The list 400 further includes one or more time stamps 408. The one or more time stamps 408 are indicative of a time taken by the first training assessor 316 to submit a given training result. For example, the first training result 404 is associated with a first time stamp 410, which is indicative that the first training assessor 316 has taken $_{60}$ seconds (i.e. a minute) to submit the first training result 404.

Returning to FIG. 3, the receiving routine 202 is further configured to receive from the log database 124 a data packet 308. The data packet 308 comprises (i) the user activity history 126 associated with each training assessors of the plurality of training assessors 301; and (ii) the set of project-specific features 306 associated with the training project 302.

The receiving routine 202 is then configured to transmit a data packet 310 to the evaluation routine 204. The data packet 310 comprises (i) the user activity history 126 associated with each training assessors of the plurality of training assessors 301, (ii) the set of project-specific features 306, and (iii) the lists of training results associated with each of the first training assessor 316, the second training assessor 318 and the third training assessor 320.

In response to receiving the data packet 310, the evaluation routine 204 is configured to execute the following.

The evaluation routine 204 is configured to analyze the lists and generate a set of user-task specific features 312, which is representative of characteristics of interactions between a given training assessor and the training project 302. For example, the set of user-task specific features 312 for the first training assessor 316 may include, but not limited to:

The one or more time stamps 408 included within the list 400;
An average time for completing the training tasks;
A median time for completing the training tasks;
A total time for the first training assessor 316 to complete the training project 302;
A number of correct result submitted by the first training assessor 316 for the honeypot task(s) (if any) included within the training project 302; and
A number of results approved or rejected by an administrator of the crowd-sourcing application 118.

Having generated the set of user-task specific features 312 for the first training assessor 316, the second training assessor 318 and the third training assessor 320, the evaluation routine 204 is configured to generate a set of training data 314 (i.e. the training input data). The set of training data 314 comprises a first triple of training data 315, a second triple of training data (not numbered), and a third triple of training data (not numbered).

Each triple of training data within the set of training data 314 is associated with a given training assessor. For example, the first triple of training data 315 comprises: (i) the user activity history 126 associated with the first training assessor 316; (ii) the set of project-specific features 306; and (iii) the set of user-task specific features 312 associated with the first training assessor 316.

In the second phase of the training, the evaluation routine 204 is configured to input the set of training data 314 into the MLA 214.

Taking the first triple of training data 315 as an example, the MLA 214 comprises a training logic to determine a set of features associated with the user activity history 126 of the first training assessor 316, the set of project-specific features 306 and the set of user-task specific features 312 of the first training assessor 316.

In some non-limiting embodiments of the present technology, the set of features may be representative of the properties of the user activity history 126 of the first training assessor 316, the set of project-specific features 306 and the gradual change of time for the first training assessor 316 to complete the training tasks (based on the one or more time stamps 408).

More precisely, recalling that the set of user-task specific features 312 associated with first training assessor 316 includes an indication of the time the first training assessor 316 has needed to complete each training tasks within the training project 302, the MLA 214 is configured to learn, a learning parameter of the first training assessor 316, which is indicative of a change in the efficiency of the first training assessor 316 to complete the training tasks within the training project 302.

The MLA 214 is further configured to determine the learning parameter for the second training assessor 318 and the third training assessor 320 using the second triple of training data and the third triple of training data, respectively.

Upon determining the learning parameter of the first training assessor 316, the second training assessor 318 and the third training assessor 320, the MLA 214 is configured to generate an inferred function which is capable of determining the productivity rate of the human assessor 106 (see FIG. 1) for completing a new type of project that is different from its previously executed project.

For example, assuming that the project 210 (see FIG. 2) is a type of project that the human assessor 106 has never executed, the inferred function is capable of determining the productivity rate of the human assessor 106 for completing the project 210, based on the set of project-specific features 128 associated with the project 210 and the user activity history 126 associated with the human assessor 106.

How the MLA 214 is implemented is not limited, and may for example be implemented as a gradient boosting decision trees model based MLA.

Needless to say, although the above explanation of the training of the MLA 214 has been made with reference to only a single training project, it is done so for ease of understanding. It should be understood that the training of the MLA 214 is done iteratively using the additional projects that have been executed by the human assessor 106.

Evaluation Routine 204- In Use

Now, having described the manner in which the MLA 214 has been trained prior to the in-use phase, attention will now be turned back to FIG. 2.

As briefly described above, in response to receiving the data packet 212, the evaluation routine 204 is configured to input the user activity history 126 and the set of project-specific features 128 into the MLA 214 to determine the productivity rate of the human assessor 106 vis-à-vis the project 210.

The evaluation routine 204 is then configured to transmit a data packet 216 to the output routine 206. The data packet 216 comprises the determined productivity rate and the project 210.

Output Routine 206- In Use

The output routine 206 is configured to receive the data packet 216 which comprises the determined productivity rate of the human assessor 106 with regards to the project 210.

In some non-limiting embodiments of the present technology, the output routine 206 is configured to transmit the project 210 and the determined productivity rate to the electronic device 120 (which is associated with the human assessor 106), in response to the electronic device 120 accessing the crowd-sourcing application 118.

In some non-limiting embodiments of the present technology, in response to the human assessor 106 completing the project 210, the MLA 214 may be further trained using the results submitted by the human assessor 106. In other words, the determined (i.e. predicted) productivity rate is compared against the "actual" productivity rate of the human assessor 106 when completing the project 210. As such, the difference between the determined productivity rate and the "actual" productivity rate is used as a penalty function when further training the MLA 214. Accordingly, after a plurality of iterations, the MLA 214 is configured to provide an accurate productivity rate that is specific to the human assessor 106.

Although the present technology has been explained as determining the productivity rate of the human assessor 106 with regards to the project 210 only, it is not limited as such. As discussed previously, the project database 121 may include one or more additional projects (each comprising tasks that are different from previously executed tasks by the human assessor 106), for which the productivity rates are determined. Accordingly, the human assessor 106 is provided with a list of projects and associated productivity rates, thereby enabling the human assessor 106 to select which of the project to select based on an informed decision.

The various non-limiting embodiments of the present technology may allow the determining the productivity rate of a given human assessor against a given project in a crowd-sourcing environment.

Figure 5:
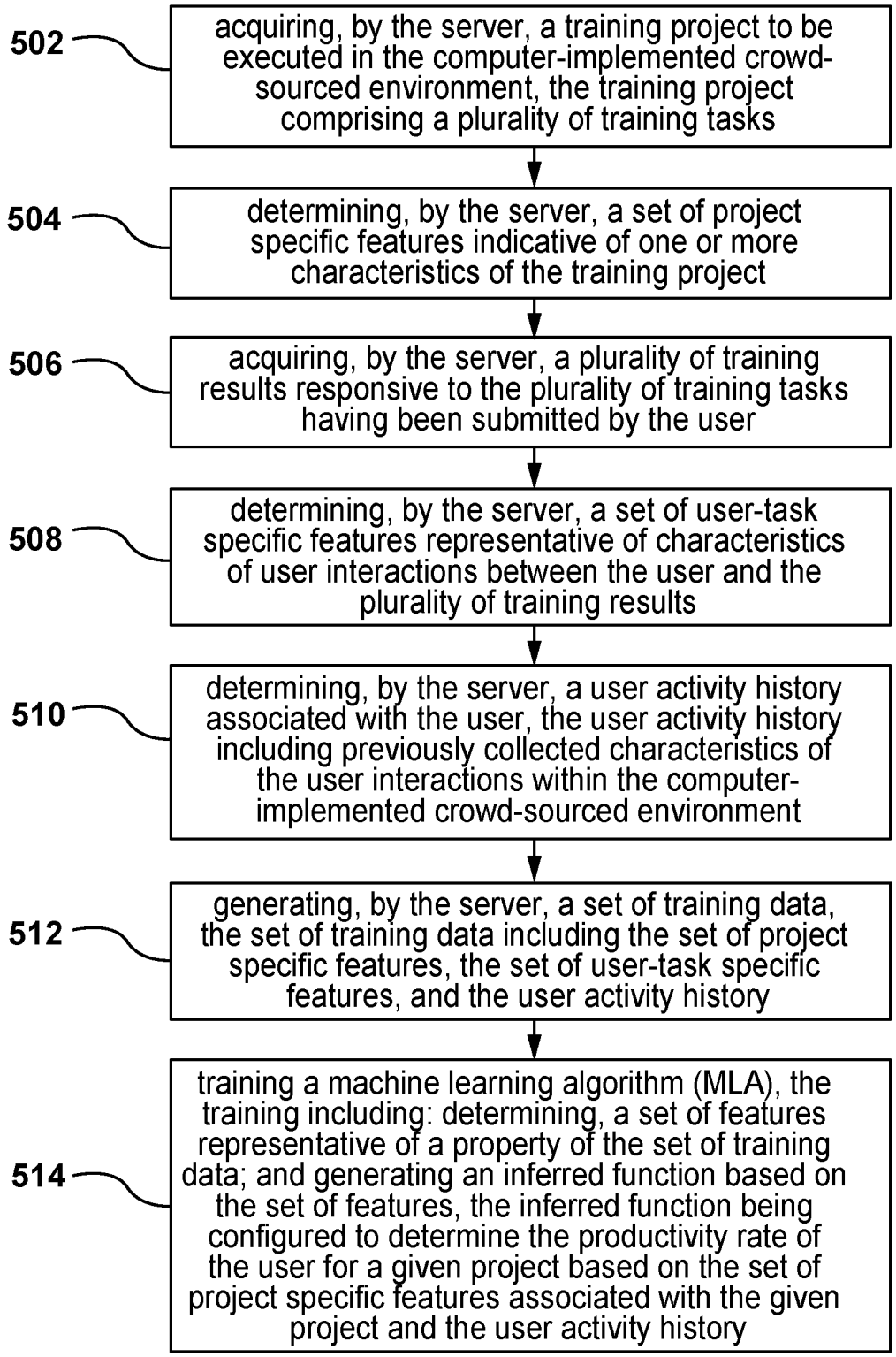
FIG. 5 depicts a block diagram of a flow chart of a method for determining a productivity rate for a human assessor for a given task in a crowd-sourced environment.

Given the architecture and examples provided herein above, it is possible to execute a computer-implemented method for determining the productivity rate of a given human assessor against a given project. With reference to FIG. 5, there is depicted a flow chart of a method 500, the method 500 being executable in accordance with non-limiting embodiments of the present technology. The method 500 can be executed by the server 102.

Step 502: acquiring, by the server, a training project to be executed in the computer-implemented crowd-sourced environment, the training project comprising a plurality of training tasks The method 500 begins with step 502, where the crowd-sourcing application 118 is configured to receive the training project 302 from a requester. The training project 302 is then stored within the project database 121.

The crowd-sourcing application 118 is then configured to make the training project 302 available to the set of training assessors 301.

Step 504: determining, by the server, a set of project-specific features indicative of one or more characteristics of the training project At step 504, the set of project-specific features 306 associated with the training project 302 is determined. In some non-limiting embodiments of the present technology, the set of project-specific features 306 is generated in response to the set of training assessors 301 receiving the training project 302, or in response to receiving the training project 302 from the requester in step 502.

In some non-limiting embodiments of the present technology, the set of project-specific features 306 is stored within the log database 124.

Step 506: acquiring, by the server, a plurality of training results responsive to the plurality of training tasks having been submitted by the user At step 506, the receiving routine 202 is configured to receive the data packet 304 from the set of training assessors 301, which comprises the set of training results submitted by each of the training assessor included within the set of training assessors 301. For example, the data packet 304 comprises the list 400 with the set of training results 402 responsive to the training project 302 submitted by the first training assessor 316.

The receiving routine 202 is then configured to transmit the data packet 310 to the evaluation routine 204. The data packet 310 comprises the set of project-specific features 306 and the list 400.

Step 508: determining, by the server, a set of user-task specific features representative of characteristics of user interactions between the user and the plurality of training results At step 508, in response to receiving the data packet 310, the evaluation routine 204 is configured to analyze the list 400 and generate a set of user-task specific features 312 associated with the first training assessor 316.

Step 510: determining, by the server, a user activity history associated with the user, the user activity history including previously collected characteristics of the user interactions within the computer-implemented crowd-sourced environment In some non-limiting embodiments of the present technology, the log database 124 is configured to store the user activity history 126 of the first training assessor 316.

At step 510, the receiving routine 202 is configured to receive the user activity history 126 of the first training assessor 316 via the data packet 308.

Step 512: generating, by the server, a set of training data, the set of training data including the set of project-specific features, the set of user-task specific features, and the user activity history At step 512, the evaluation routine 204 generates the set of training data 314, which comprises the first triple of training data 315. The first triple of training data includes the user activity history 126 associated with the first training assessor 316, the set of user-task specific features 312 associated with the first training assessor 316, and the set of project-specific features 306.

Step 514: training a machine learning algorithm (MLA), the training including: determining, a set of features representative of a property of the set of training data; and generating an inferred function based on the set of features, the inferred function being configured to determine the productivity rate of the user for a given project based on the set of project-specific features associated with the given project and the user activity history At step 514, the MLA 214 is trained. The evaluation routine 204 is configured to input the set of training data 314 into the MLA 214. In some non-limited embodiments of the present technology, the MLA 214 comprises a training logic to determine a set of features associated with the user activity history 126 associated with the first training assessor 316, the set of project-specific features 306 associated with the first training assessor 316 and the set of user-task specific features 312.

In some non-limiting embodiments of the present technology, the set of features may be representative of the properties of the user activity history 126 associated with the first training assessor 316, the set of project-specific features 306 associated with the first training assessor 316, and the change of time required for the first training assessor 316 to complete the training tasks (based on the one or more time stamps 408).

More precisely, recalling that the set of user-task specific features 312 includes an indication of the time the first training assessor 316 has needed to complete each training tasks within the training project 302, the MLA 214 is configured to learn, a learning parameter of the first training assessor 316, which is indicative of a change in the efficiency of the first training assessor 316 to complete the training tasks within the training project 302.

Upon determining the learning parameter of the first training assessor 316, the MLA 214 is configured to generate an inferred function which is capable of determining the productivity rate of the human assessor 106 (see FIG. 1) for completing the project 210 (see FIG. 2) during the in-use phase, based on the set of project-specific features 128 associated with the project 210 and the user activity history 126.

The method 500 then terminates.

It should be apparent to those skilled in the art that at least some embodiments of the present technology aim to expand a range of technical solutions for addressing a particular technical problem encountered by the conventional crowd-sourcing technology, namely determining a productivity rate of a given human assessor with regards to a project.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method of determining a productivity rate of a user in a computer-implemented crowd-sourced environment, the method being executed by a server, the method comprising, at a training phase:

acquiring, by the server, a training project to be executed in the computer-implemented crowd-sourced environment, the training project comprising a plurality of training tasks;

determining, by the server, a set of project-specific features indicative of one or more characteristics of the training project;

acquiring, by the server, a plurality of training results responsive to the plurality of training tasks having been submitted by the user in a chronological order;

determining, by the server, a set of user-task specific features representative of characteristics of user interactions between the user and the plurality of training results, the set of user-task specific features comprising at least a respective time stamp for each training task within the plurality of training tasks, the time stamp being indicative of a time taken for the user to submit the associated training result;

determining, by the server, a user activity history associated with the user, the user activity history including previously collected characteristics of the user interactions within the computer-implemented crowd-sourced environment;

generating, by the server, a set of training data, the set of training data including the set of project-specific features, the set of user-task specific features, and the user activity history;

training a machine learning algorithm (MLA), the training including:

determining, a set of features representative of a property of the set of training data; and generating an inferred function based on the set of features, the inferred function being configured to determine the productivity rate of the user for a given project based on the set of project-specific features associated with the given project and the user activity history, wherein the generating the inferred function comprises determining a learning parameter associated with the user, the learning parameter being indicative of a change in efficiency of the user to submit a given training result following a number of given training results, the learning parameter being determined based at least on an analysis of the respective time stamp of each training task within the plurality of training tasks submitted in the chronological order.

2. The method of claim 1, further comprising, at an in-use phase:

acquiring, by the server, an in-use project for execution in the computer-implemented crowd-sourced environment, the in-use project comprising a plurality of in-use tasks;

determining, by the server, the set of project-specific features associated with the in-use project;

determining, using the MLA, the productivity rate of the user for completing the project based on the set of project-specific features associated with the in-use project and the user activity history.

3. The method of claim 2, wherein the server is coupled, via a communication network, to a client device associated with the user;

the acquiring the in-use project is executed prior to the client device accessing the computer-implemented crowd-sourced environment; and the method further comprising:

transmitting, the productivity rate to the client device for display in response to the client device accessing the in-use project in the computer-implemented crowd-sourced environment.

4. The method of claim 2, wherein
each of the training tasks included within the plurality of training tasks is a first type of task;
each of the tasks included within the plurality of in-use tasks is a second type of task, the second type of task being different from the first type of task.

5. The method of claim 2, wherein
each of the training tasks included within the plurality of training tasks is different from a plurality of old tasks previously executed by the user in the computer-implemented crowd-sourced environment.

6. The method of claim 5, wherein the plurality of old tasks is an entirety of previously executed tasks by the user within the computer-implemented crowd-sourced environment.

7. The method of claim 6, wherein the plurality of training tasks being different from the plurality of old tasks allows to account for a learning effect.

8. The method of claim 1, wherein the productivity rate of the user associated with the given project is at least one of:
a predicted time for the user to complete the given project;
a predicted hourly earning for completing the given project.

9. The method of claim 1, wherein the determining the productivity rate of the user for the given project comprises determining the productivity rate based at least on the learning parameter of the user.

10. The method of claim 1, wherein the set of project-specific features comprises at least one of:
a number of training tasks included within the plurality of training tasks;
a time of creation of the training project;
a number of selectable results within each training task;
user earnings per each training task; and
an instruction length of the training project.

11. The method of claim 1, wherein the user activity history comprises at least one of:
a time of a registration of the user within the computer-implemented crowd-sourced environment;
a number of projects completed since the time of registration;
a type of an operating system of a device used by the user for submitting the plurality of training results; and
a type of the device.

12. The method of claim 1, wherein the MLA is a gradient boosting decision trees model based MLA.

13. A system for determining a productivity rate of a user in a computer-implemented crowd-sourced environment, the system comprising a server, the server comprising a processor configured to, at a training phase:
acquire a training project to be executed in the computer-implemented crowd-sourced environment, the training project comprising a plurality of training tasks in a chronological order;
determine a set of project-specific features indicative of one or more characteristics of the training project;
acquire a plurality of training results responsive to the plurality of training tasks having been submitted by the user;
determine a set of user-task specific features representative of characteristics of user interactions between the user and the plurality of training results, the set of user-task specific features comprising at least a respective time stamp for each training task within the plurality of training tasks, the time stamp being indicative of a time taken for the user to submit the associated training result;
determine a user activity history associated with the user, the user activity history including previously collected characteristics of the user interactions within the computer-implemented crowd-sourced environment;
generate a set of training data, the set of training data including the set of project-specific features, the set of user-task specific features, and the user activity history;
train a machine learning algorithm (MLA), to train the MLA, the processor being configured to:
determine, a set of features representative of a property of the set of training data; and
generate an inferred function based on the set of features, the inferred function being configured to determine the productivity rate of the user for a given project based on the set of project-specific features associated with the given project and the user activity history, wherein
to generate the inferred function, the processor being configured to determine a learning parameter associated with the user, the learning parameter being indicative of a change in efficiency of the user to submit a given training result following a number of given training results, the learning parameter being determined based at least on an analysis of the respective time stamp of each training task within the plurality of training tasks submitted in the chronological order.

14. The system of claim 13, wherein the processor is further configured to:
at an in-use phase:
acquire an in-use project for execution in the computer-implemented crowd-sourced environment, the in-use project comprising a plurality of in-use tasks;
determine the set of project-specific features associated with the in-use project;
determine using the MLA, the productivity rate of the user for completing the project based on the set of project-specific features associated with the in-use project and the user activity history.

15. The system of claim 14, wherein
the server is coupled, via a communication network, to a client device associated with the user;
the processor is configured to acquire the in-use project prior to the client device accessing the computer-implemented crowd-sourced environment; and
the processor is further configured to:
transmit, the productivity rate to the client device for display in response to the client device accessing the in-use project in the computer-implemented crowd-sourced environment.

16. The system of claim 14, wherein
each of the training tasks included within the plurality of training tasks is a first type of task;
each of the tasks included within the plurality of in-use tasks is a second type of task, the second type of task being different from the first type of task.

17. The system of claim 14, wherein
each of the training tasks included within the plurality of training tasks is different from a plurality of old tasks previously executed by the user in the computer-implemented crowd-sourced environment.

18. The system of claim 17, wherein the plurality of old tasks is an entirety of previously executed tasks by the user within the computer-implemented crowd-sourced environment.

19. The system of claim 18, wherein the plurality of training tasks is different from the plurality of old tasks allows to account for a learning effect.

* * * * *